US012725894B2

(12) United States Patent
Kim et al.

(10) Patent No.: US 12,725,894 B2
(45) Date of Patent: Sep. 1, 2026

(54) DIGITAL SIGNAL INTEGRITY IMPROVING STRUCTURES FOR ULTRA-HIGH SPEED DIGITAL SIGNAL TRANSMISSION THROUGH COMMON-SIGNAL REJECTION AND PHASE RECOVERY

(71) Applicant: Kyungpook National University Industry-Academic Cooperation Foundation, Daegu (KR)

(72) Inventors: Kang Wook Kim, Daegu (KR); Byung Cheol Min, Daegu (KR); Jeong Sik Choi, Daegu (KR)

(73) Assignee: Kyungpook National University Industry-Academic Cooperation Foundation, Daegu (KR)

( * ) Notice: Subject to any disclaimer, the term of this patent is extended or adjusted under 35 U.S.C. 154(b) by 173 days.

(21) Appl. No.: 18/625,650

(22) Filed: Apr. 3, 2024

(65) Prior Publication Data

US 2024/0332765 A1 Oct. 3, 2024

(30) Foreign Application Priority Data

Apr. 3, 2023 (KR) ........................ 10-2023-0043627

(51) Int. Cl.
*H01P 1/00* (2006.01)
*H01P 3/08* (2006.01)

(52) U.S. Cl.
CPC . *H01P 1/00* (2013.01); *H01P 3/08* (2013.01)

(58) Field of Classification Search
CPC .... H01P 3/08; H01P 5/10; H01P 5/107; H01P 3/026; H01P 3/121; H01P 1/32;
(Continued)

(56) References Cited

U.S. PATENT DOCUMENTS 6,023,209 A * 2/2000 Faulkner ................. H01P 3/003 257/664
8,963,658 B2 * 2/2015 Chen ......................... H01P 5/08 257/664
(Continued)

FOREIGN PATENT DOCUMENTS

KR 10-2023-0055036 A 4/2023

*Primary Examiner* — John W Poos
(74) *Attorney, Agent, or Firm* — Osha Bergman Watanabe & Burton LLP

(57) ABSTRACT

The present disclosure relates to ultra-high speed digital signal integrity improving structures. Each structure in the present disclosure includes a first unit structure and a second unit structure of the same or different shapes arranged to face each other on the left and right sides along a longitudinal direction of a balanced line, centered around a coplanar stripline (CPS) or parallel stripline (PSL) formed on a substrate. At least one of the first unit structure and the second unit structure includes a first side close to the balanced line and having a linear or curve shape; a second side facing the first side; and left and right sides connecting the first side and the second side. Here, the width of the first side is less than or equal to that of the second side, the left and right sides have a linear or non-linear slope, and the width from the first side to the second side is configured to change continuously or discontinuously. When the structures of the present disclosure are disposed around a balanced line, it has the advantage of being able to recover the distorted phase autonomously while rejecting a common-mode signal in a frequency band up to 40 GHz or more.

16 Claims, 14 Drawing Sheets

(58) Field of Classification Search
CPC .... H01P 1/00; H01P 1/203; H01P 1/20; H01P 3/02; H01P 1/18; H01P 1/15; H01P 1/10; H01P 3/081; H01P 7/082; H01P 7/10; H01P 7/08; H01P 3/085; H01P 3/003; H01P 1/36; H01P 1/212; H01P 1/208; H01P 1/20309; H01P 1/183; H01P 5/028; H01P 11/00; H01P 5/1007; H01P 1/202; H01P 5/08; H01P 1/2039; H01P 5/12; H01P 1/04; H01P 1/047; H01P 1/068; H01P 1/20381; H01P 5/085; H01P 5/16; H01P 5/22
See application file for complete search history.

(56) References Cited

U.S. PATENT DOCUMENTS

| | | | | |
|---|---|---|---|---|
| 9,647,310 | B2 * | 5/2017 | Reza | H01P 1/162 |
| 2013/0162366 | A1 * | 6/2013 | Essenwanger | H01P 5/028 333/26 |
| 2015/0255842 | A1 * | 9/2015 | Reza | H01P 1/162 333/24 R |

* cited by examiner (a)

(b)

(a)

(b)

(a)

(b)

(a)

(b)

(a)

(b)

(a)

(b)

DIGITAL SIGNAL INTEGRITY IMPROVING STRUCTURES FOR ULTRA-HIGH SPEED DIGITAL SIGNAL TRANSMISSION THROUGH COMMON-SIGNAL REJECTION AND PHASE RECOVERY

CROSS-REFERENCE TO RELATED APPLICATIONS

This application claims the benefit under 35 U.S.C. 119(a) of Korean Patent Application No. 10-2023-0043627 filed on Apr. 3, 2023 with the Korean Intellectual Property Office, the entire disclosure of which is incorporated herein by reference for all purposes.

BACKGROUND

1. Field

The following description relates to ultra-high speed digital signal integrity improving structures that can autonomously recover a distorted phase while rejecting a common-mode signal in a frequency band up to 40 GHz or more.

2. Description of Related Art

An ultra-high speed digital signal transmission is required for the transmission of high-capacity digital data for the 5th generation and the next-generation communications. Up to now, a differential line has been used as a transmission line for a high-speed digital signal. However, it is extremely difficult, if not impossible, to use the differential line in a frequency band of 10 GHz or more due to various problems, including a signal skew phenomenon by a length difference between two signal lines, uneven electromagnetic interference (EMI) due to adjacent lines, a non-linear phase distortion phenomenon due to electromagnetic (EM) coupling between signal lines of a differential line when a phase difference in which two signal lines deviate from 180° occurs, phase difference occurrence by fiber weave effects in an FR4 substrate, etc.

Further, the above-mentioned problems in a differential line cause a common-mode signal, which degrades the performance of digital circuit operations. The common-mode signal consists of frequency components that are generally higher than the frequency spectrum of a differential signal, becomes a main cause of electromagnetic interference (EMI) and adversely affects the operation of a circuit receiving a signal. Therefore, for an unflawed operation of a digital circuit, it is necessary to suppress the magnitude of the common-mode signal, and to this end, a filter for rejecting the common-mode signal is required.

Most commercial common-mode signal rejection filters have a way that winds two signal lines of a differential line around a ferrite core and rejects the common-mode signal through a magnetic field generated by the ferrite core. However, since the impedance of an inductor generated by winding two signal lines around the ferrite core is affected by parasitic components as frequencies increase above a specific frequency, the frequency band of the common-mode signal rejection is limited to approximately 10 GHz or less.

In addition, common-mode signal rejection filters published in papers so far mostly adopt a scheme using various types of resonance structures that modify the ground surface under the differential line. However, the reported common-mode signal rejection filters do not provide enough frequency bandwidth, having a maximum frequency of about 15 GHz or less, which is not suitable for use for the next-generation ultra-high speed digital communication.

Therefore, the common-mode signal rejection filter, which has been proposed or in use so far, has a limited frequency bandwidth within approximately 15 GHz, so the improvement of an ultra-wideband common-mode signal rejection performance is required for the ultra-high speed digital signal transmission of dozens or hundreds of Gbps in the future.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

An object of the present disclosure is to provide ultra-high speed digital signal integrity improving structures which can reject or suppress a common-mode signal in a frequency band of a predetermined range or more (i.e., 40 GHz or more) while minimizing an influence applied to a differential signal required for ultra-high speed digital signal transmission and, at the same time, autonomously recovering a distorted phase.

Another object of the present disclosure is to provide ultra-high speed digital signal integrity improving structures which enable common-mode signal rejection and phase recovery to enable ultra-high speed digital communication when a common-mode signal is generated due to distortion of a digital signal which passes through a differential line-based circuit and a non-linear phase distortion phenomenon occurs due to a length difference between two signal lines and electromagnetic coupling between signal lines.

The technical problems of the present invention are not limited to the technical problems mentioned above, and other technical problems not mentioned will be clearly understood by those skilled in the art from the description below.

In one general aspect, ultra-high speed digital signal integrity improving structures are structures that are arranged to face each other on the left and right sides along a longitudinal direction of a balanced line, centered around a first-type balanced line or a second-type balanced line formed on a substrate, to reject a common-mode signal and recover a distorted phase while minimally affecting a differential signal. The structures include a first unit structure and a second unit structure, which may be identical or different in shape. At least one of the first unit structure and the second unit structure includes a first side close to the balanced line and having a linear or curve shape; a second side facing the first side; and left and right sides connecting the first side and the second side. A width of the first side is less than or equal to a width of the second side, the left and right sides have a linear or non-linear slope, and a width from the first side to the second side is configured to change continuously or discontinuously. The first-type balanced line is a coplanar stripline (CPS), and the second-type balanced line is a parallel stripline (PSL).

The structures may be formed entirely from a conductor.

The structures may be configured in a state in which a portion of an internal conductor is removed.

A first side of the first unit structure and a first side of the second unit structure may be spaced apart at a predetermined interval.

A second side of the first unit structure and a second side of the second unit structure may be connected to or spaced apart from a ground formed on the substrate.

The unit structures may be arranged along the longitudinal direction of the balanced line, with at least one or more structures. The arranged structures may have either identical or different shapes.

The unit structures may be arranged along the longitudinal direction of the balanced line periodically or aperiodically.

In another general aspect of ultra-high speed digital signal integrity improving structures, the structures comprise a transition structure connecting a balanced line to a differential line and are arranged to face each other on the left and right sides along a longitudinal direction of the balanced line to reject a common-mode signal and recover a distorted phase while minimally affecting a differential signal. The structures include a first unit structure and a second unit structure, which may be identical or different in shape. At least one of the first unit structure and the second unit structure includes a first side close to the balanced line and having a linear or curve shape; a second side facing the first side; and left and right sides connecting the first side and the second side, a width of the first side is less than or equal to a width of the second side, and the left and right sides have a linear or non-linear slope, and a width from the first side to the second side is configured to change continuously or discontinuously.

The structures may be formed either entirely from a conductor or with a portion of an internal conductor removed.

A first side of the first unit structure and a first side of the second unit structure may be spaced apart at a predetermined interval.

A second side of the first unit structure and a second side of the second unit structure may be connected to or spaced apart from a ground formed on the substrate.

The unit structures may be arranged along the longitudinal direction of the balanced line, with at least one or more structures. The arranged structures may have either identical or different shapes. The unit structures may be arranged along the longitudinal direction of the balanced line periodically or aperiodically.

In another general aspect, surface-mounted digital signal integrity improving structures includes a first substrate with a differential line; a second substrate with a balanced line. On the second substrate, the structures are arranged to face each other on the left and right sides along a longitudinal direction of the balanced line, centered around the balanced line. The structures include a first unit structure and a second unit structure, which may be identical or different in shape. At least one of the first unit structure and the second unit structure includes a first side close to the balanced line and having a linear or curve shape; a second side facing the first side; and left and right sides connecting the first side and the second side. A width of the first side is less than or equal to a width of the second side, the left and right sides have a linear or non-linear slope, and a width from the first side to the second side is configured to change continuously or discontinuously.

The structures may be formed either entirely from a conductor or with a portion of an internal conductor removed.

A first side of the first unit structure and a first side of the second unit structure may be spaced apart at a predetermined interval.

A second side of the first unit structure and a second side of the second unit structure may be connected to or spaced apart from a ground formed on the substrate.

The unit structures may be arranged along the longitudinal direction of the balanced line, with at least one or more structures. The arranged structures have either identical or different shapes. The unit structures are arranged along the longitudinal direction of the balanced line periodically or aperiodically.

According to an example of the present disclosure, the common-mode signal can be suppressed or rejected in a frequency band of up to 40 GHz or more, and at the same time, the distorted phase can be autonomously recovered, so there is an effect of significantly improving the quality of the digital signal, and the digital signal can be transmitted according to an ultra-high transmission speed.

According to an example of the present disclosure, an effect can be expected in which the ultra-high speed digital signal integrity improving structures can be applied to high-speed interfaces and chips, so the ultra-high speed digital signal integrity improving structures can also be easily applied to next-generation communication technology in addition to 5th generation communication technology, requiring high performance and super-wide frequency bandwidth.

According to an example of the present disclosure, since a phase difference generated by a length difference between differential lines and a phase difference by a configured fiber weave structure can be recovered even in a general FR4 substrate, ultra-high speed digital signal transmission can be significantly improved compared to the related art made by an inexpensive PCB process.

According to an example of the present disclosure, when the ultra-high speed digital signal integrity improving structures are applied to a differential line-based digital circuit board, the quality of the digital signal can be improved, and in particular, when the ultra-high speed digital signal integrity improving structures are combined by an ultra-wideband transition structure of connecting a balanced line to the differential line, the frequency band of up to 40 GHz or more can be secured, which enables ultra-high speed digital signal transmission.

DETAILED DESCRIPTION

Figure 1:
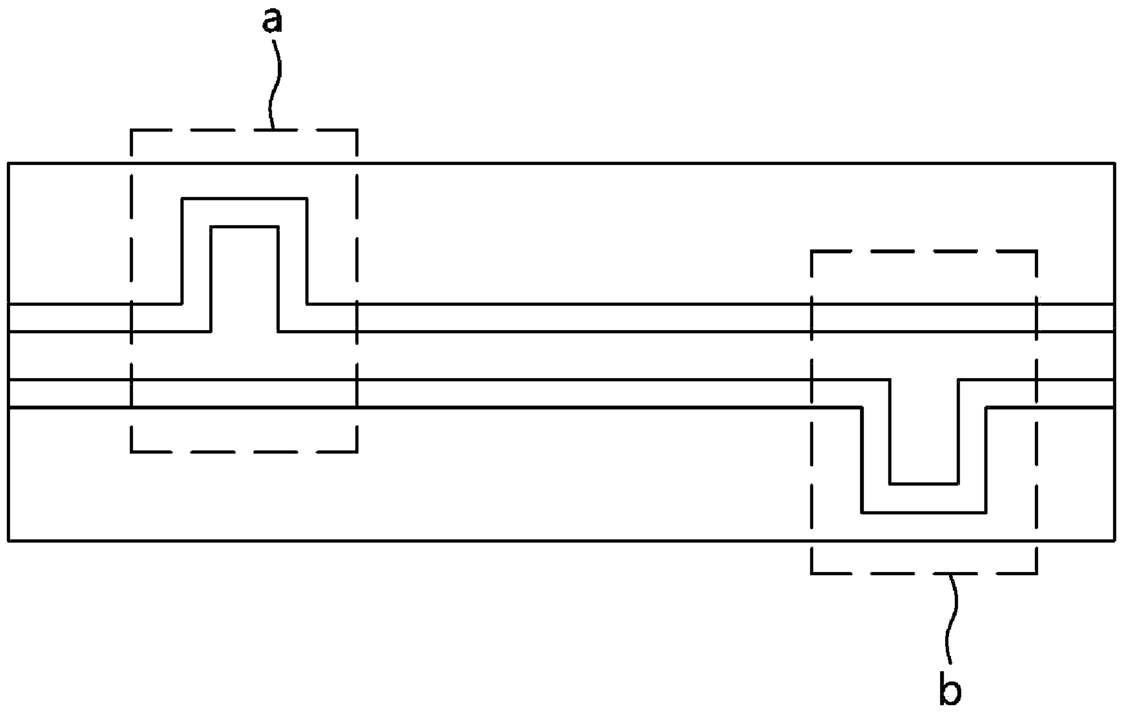
FIG. 1 illustrates a diagram describing a length difference between two signal lines of a differential line, which are digital lines in the related art.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

Although terms such as “first,” “second,” and “third” may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

The terminology used herein is for describing various examples only, and is not to be used to limit the disclosure. The articles “a,” “an,” and “the” are intended to include the plural forms as well, unless the context clearly indicates otherwise. The terms “comprises,” “includes,” and “has” specify the presence of stated features, numbers, operations, members, elements, and/or combinations thereof, but do not preclude the presence or addition of one or more other features, numbers, operations, members, elements, and/or combinations thereof.

The spatially relative terms below, beneath, lower, above, upper, and the like may be used to facilitate the description of the relationship of one element or component to another element or component as shown in the drawings. Spatially relative terms should be understood to include different orientations of an element in use or operation in addition to the orientations shown in the drawings. For example, an element described as being “below” or “beneath” another element may be “above” or “upper” another element when the elements shown in the drawing are inverted. Thus, the exemplary term below may include both below and above orientations. Elements may also be oriented in other directions, and accordingly, spatially relative terms may be interpreted according to their orientation.

An expression representing a part of the terms such as “part” or “portion” used in the present disclosure may be used herein to describe a device that may include a specific function, software that may include a specific function, or a combination of devices and software that may include a specific function, and is not to be used to limit the described function. This is provided to help a more general understanding of the present disclosure, and various modifications and variations may be made from these descriptions by those of ordinary skill in the field to which the present disclosure belongs.

Additionally, it should be noted that all electric signals used in the present disclosure, as an example, may be reversed in signs of all electric signals to be described below when an inverter or the like is additionally provided in the circuit of the present disclosure. Therefore, the scope of the claims of the present disclosure is not limited to the direction of the signal.

The features of the examples described herein may be combined in various ways as will be apparent after an understanding of the disclosure of this application. Further, although the examples described herein have a variety of configurations, other configurations are possible as will be apparent after an understanding of the disclosure of this application.

Hereinafter, the present disclosure is described in more detail based on the example illustrated in the drawings.

Before explaining the present invention, the non-linear phase distortion phenomenon, which occurs due to the length difference between two signal lines of a differential line and the electromagnetic coupling between two signal lines, is described. The reason is that the phase unbalance causes the common-mode signal, and the common-mode signal becomes the main cause of the electromagnetic interference (EMI), which adversely affects the circuit operation.

FIG. 1 is a diagram describing the length difference between two signal lines of a differential line, which is a digital line in the related art.

When a length difference between two signal lines occurs as illustrated in FIG. 1 (e.g., due to a curve portion by rotation of lines, etc.) (region a), a length compensation structure (region b) is applied to a signal line having a relatively shorter length to compensate for the phase difference. In this case, the non-linear phase distortion phenomenon due to the electromagnetic coupling between two signal lines may occur, and there is a problem in that phase distortion becomes further deepened as the frequency is higher in spite of compensating the line length as described above.

Figure 2:
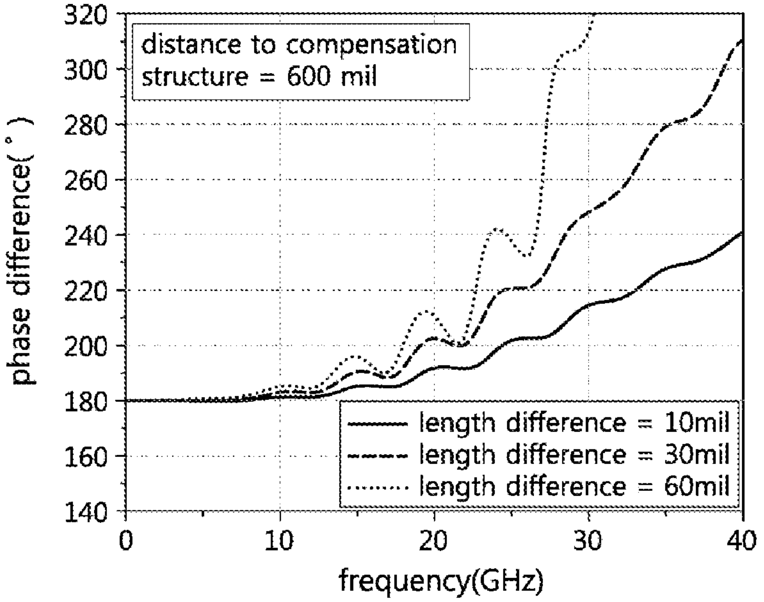
FIG. 2 illustrates a graph showing a phase distortion level when a length compensation structure is applied to the differential line in the presence of a length difference between two signal lines of the differential line.
Figure 2:
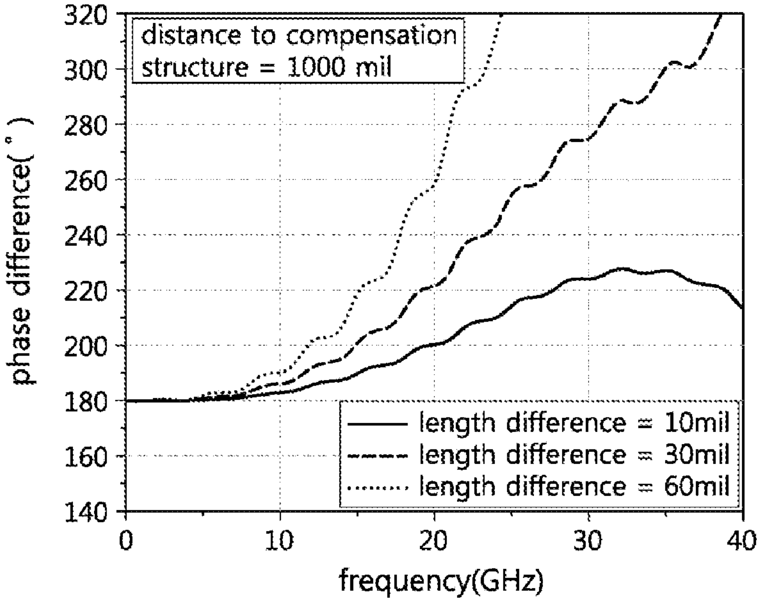

FIG. 2 is a graph showing a phase distortion level when a length compensation structure is applied when there is a length difference between two signal lines of a differential line. FIG. 2 illustrates a 3D EM simulation result using a Rogers 4003 substrate having a thickness of 8 mil. (a) of FIG. 2 illustrates a case where a distance between a section where the length difference occurs and a length compensation structure is 600 mil, and (b) of FIG. 2 illustrates a case where the distance between the section where the length difference occurs and the length compensation structure is 1000 mil.

Referring to this, it can be seen that when a length difference of 30 mil or more occurs, the phase is distorted by 20 degrees or more after 20 GHz. Further, it can be seen that when a length difference of 60 mil or more occurs, the phase is distorted by 20 degrees or more after 11.7 GHz when the distance up to the length compensation structure is 1000 mil.

As described above, it can be seen that when the length difference between two signal lines of a differential line occurs, the non-linear phase distortion phenomenon of the differential lines becomes more significant as the frequency increases, so it is impossible to recover the distorted phase simply by applying the length compensation structure.

Meanwhile, when an FR4 substrate generally used as a commercial digital circuit board in FIG. 1 is applied to the differential lines, the phase difference occurs due to the configured fiber weave structure of the FR4 substrate. That is, even though there is no length difference between two signal lines of a differential line, an effective length difference of approximately 0 to 107 mil (approximately 10% of a maximum differential line length) occurs according to the location and direction in which the differential line is placed per 1 inch (1000 mil) length of the signal line on the configured fiber weave structure of the FR4 substrate. Therefore, the effective length difference between two signal lines of a differential line may randomly vary for each PCB, and thus, it is actually impossible to predict and compensate for a value of the effective length difference for each PCB.

Figure 3:
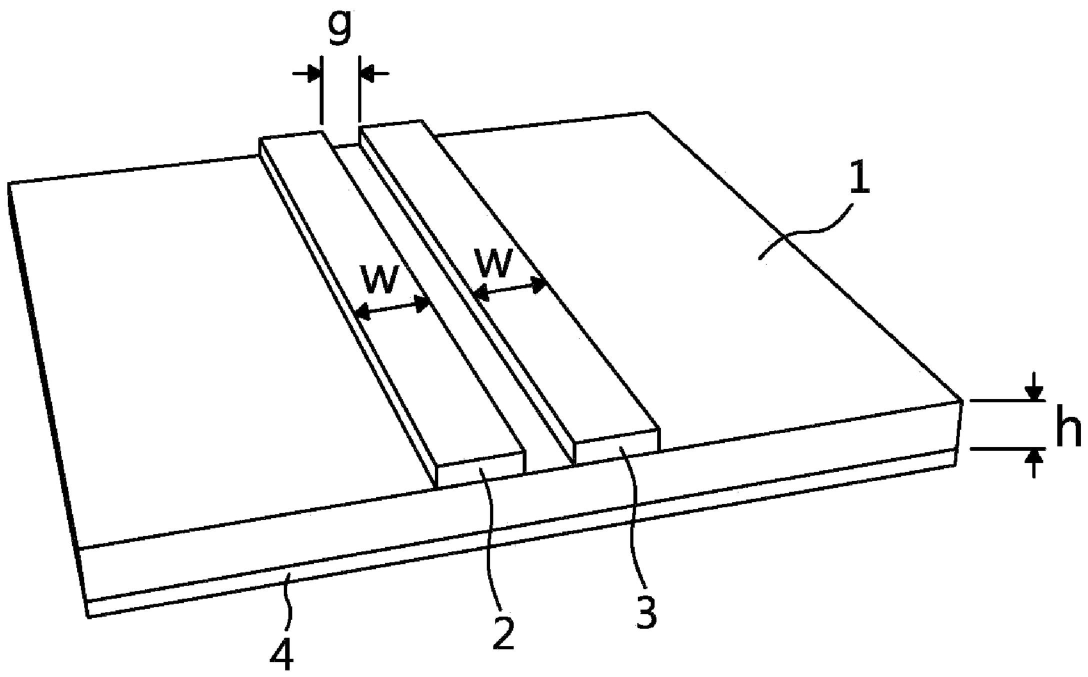
FIG. 3 illustrates a differential line structure.

FIG. 3 illustrates a differential line structure. Referring to FIG. 3, a dielectric substrate 1 having a height of h is provided, and a first signal line 2 and a second signal line 3, which may apply signals having opposite polarities to each other, are placed on the upper end of the dielectric substrate 1, and a ground 4 is formed on the lower end of the dielectric substrate 1. The first signal line 2 and the second signal line 3 may be microstrip (MS) lines. In addition, when a differential signal is applied, the first signal line 2 and the second signal line 3 have opposite polarities to each other. For example, when the first signal line 2 is a negative line, the second signal line 3 may be a positive line. Widths w of the first signal line 2 and the second signal line 3 are equal, and the first signal line 2 and the second signal line 3 are spaced apart from each other by a gap distance of g.

Figure 4:
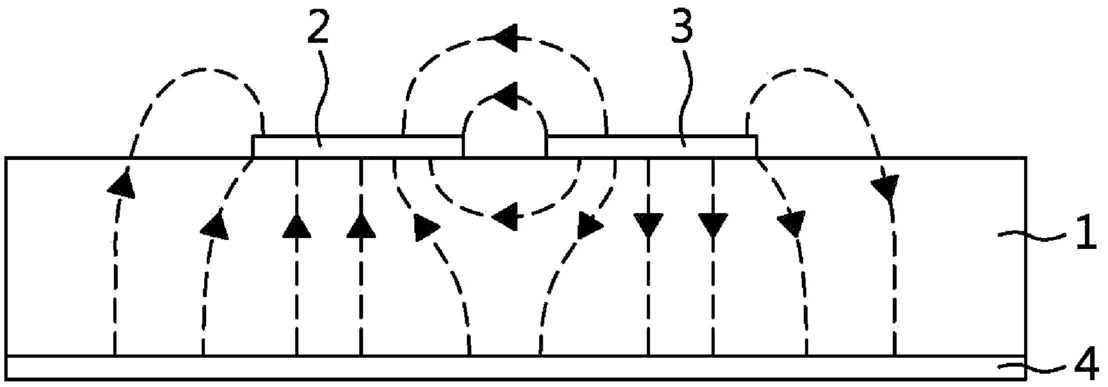
FIG. 4 illustrates a diagram showing an electric field distribution for the case of applying the differential signals in the differential lines in FIG. 3.

FIG. 4 is a diagram illustrating an electric field distribution for the case of applying a differential signal to a differential line in FIG. 3. Referring to this, there is an electric field connecting two signal lines 2 and 3, and respective electric fields are distributed between two signal lines 2 and 3 and the ground 4. In particular, when there is a phase difference that deviates from 180° between two signal lines 2 and 3 of the differential line, the non-linear phase distortion phenomenon occurs due to electromagnetic coupling generated between two signal lines 2 and 3, and when an operating frequency is 10 GHz or more, the non-linear phase distortion phenomenon becomes significant, so it is impossible that the phase is autonomously recovered in the differential lines.

Figure 5:
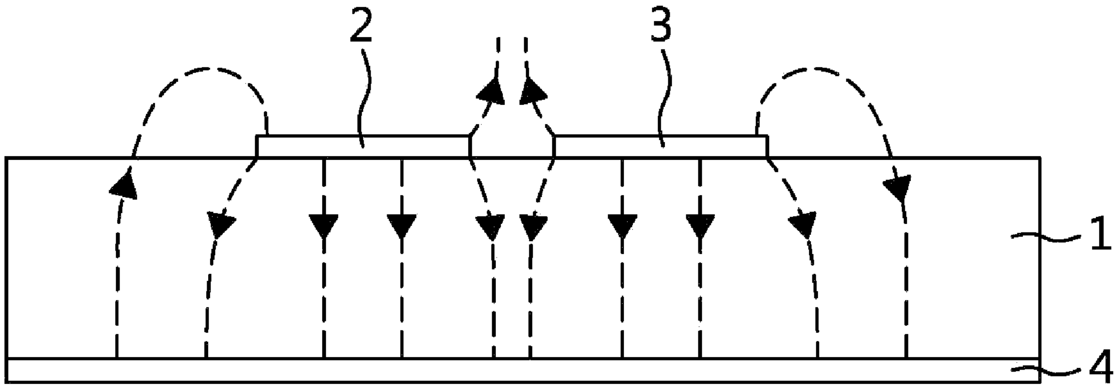
FIG. 5 illustrates a diagram showing an electric field distribution for the case of applying a common-mode signal in the differential lines in FIG. 3.

FIG. 5 is a diagram illustrating an electric field distribution for the common-mode signal in a differential line in FIG. 3. Referring to this, as a case where signals having the same polarity are applied to two signal lines 2 and 3, it is possible to apply the signals in phase to two signal lines 2 and 3 independently. Therefore, it is impossible to autonomously suppress the common-mode signal, so an additional common-mode signal rejection filter is required.

Figure 6:
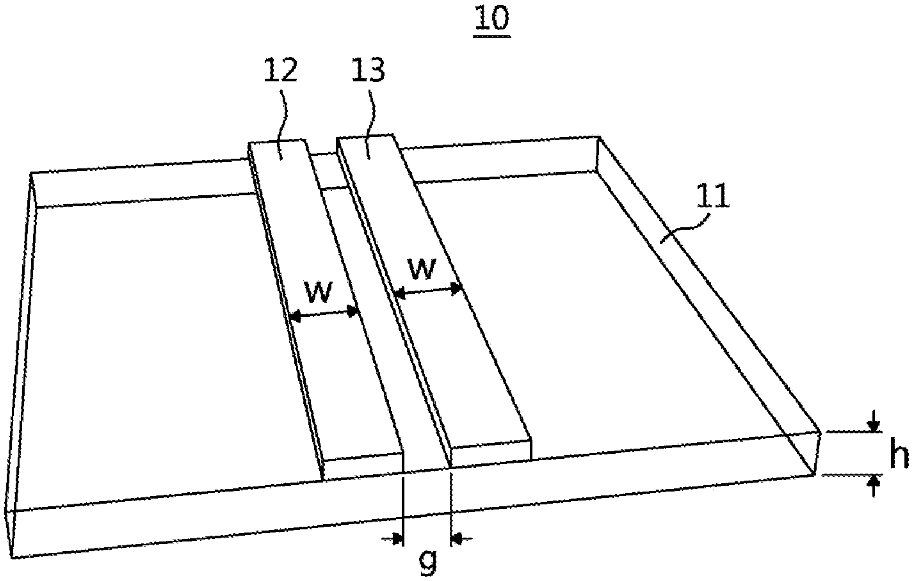
FIG. 6 illustrates balanced line structures.
Figure 6:
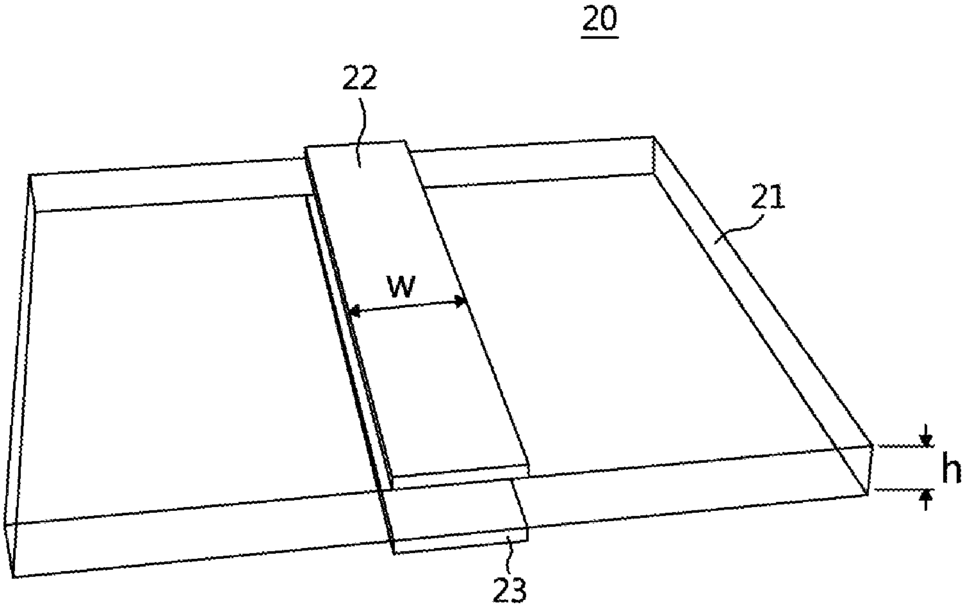

FIG. 6 illustrates balanced line structures. (a) of FIG. 6 illustrates a first-type balanced line (coplanar stripline (CPS)), and (b) of FIG. 6 illustrates a second-type balanced line (parallel stripline (PSL)).

Characteristics of the balanced line provide features in which ultra-wideband differential signal transmission is possible, EMI from other lines in proximity may be suppressed, when the phase difference which deviates from 180° between two signal lines occurs, the phase may be autonomously recovered, and main design parameters may be calculated through analytical formulas considering the electric field distribution and a dielectric constant of a substrate, and performance enhancement is possible through a characteristic impedance change. In addition, the second-type balanced line PSL may maintain signal integrity even in a bent line.

As illustrated in (a) and (b) of FIG. 6, the balanced lines do not have an additional ground line or plate, but two signal lines become mutual ground lines to each other to transmit the differential signal.

Specifically, in a CPS line 10 of (a) of FIG. 6, a dielectric substrate 11 having a predetermined height of h is provided, and a first signal line 12 and a second signal line 13 having opposite polarities to each other are placed on the upper end of the dielectric substrate 11. Widths w of the first signal line 12 and the second signal line 13 are equal, and the first signal line 12 and the second signal line 13 are spaced apart from each other by a gap distance of g.

In addition, in a PSL line 20 of (b) of FIG. 6, a dielectric substrate 21 having a predetermined height of h is provided, and a first signal line 22 is placed on the upper end of the dielectric substrate 21 and a second signal line 23 is placed on the lower end of the dielectric substrate 21. The first signal line 22 and the second signal line 23 have opposite polarities to each other and are placed to be parallel to each other. Widths w of the first signal line 22 and the second signal line 23 are equal.

Figure 7:
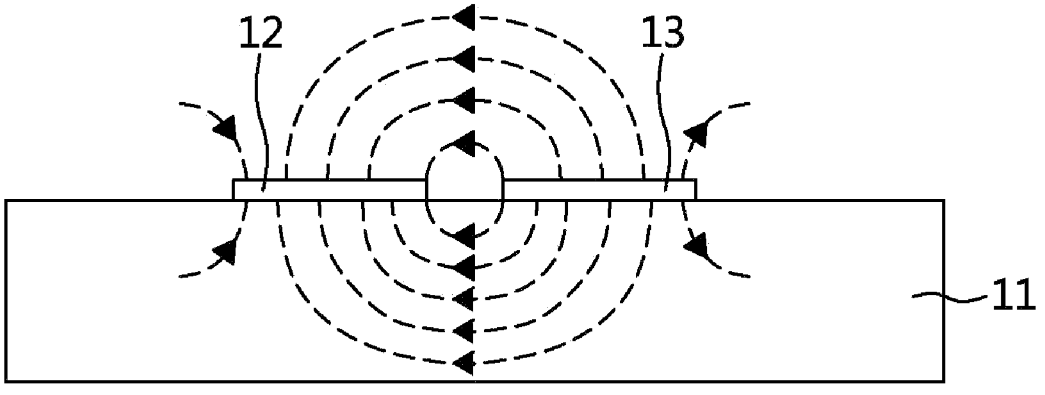
FIGS. 7 and 8 illustrate diagrams of the electric field distributions of differential signals on balanced lines, CPS lines and PSL lines, as well as the electric field distributions of common-mode signals.
Figure 7:
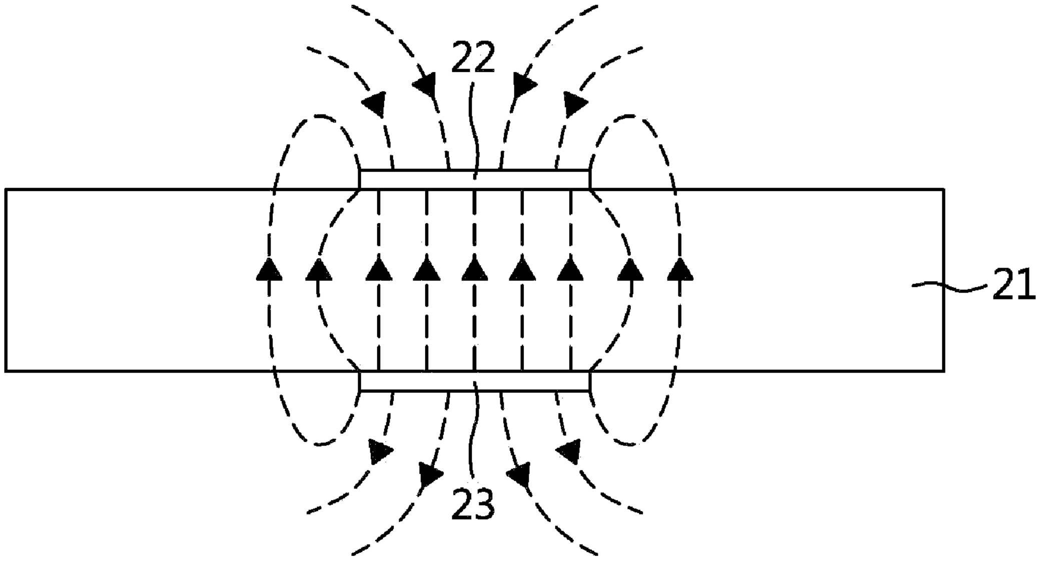
Figure 8:
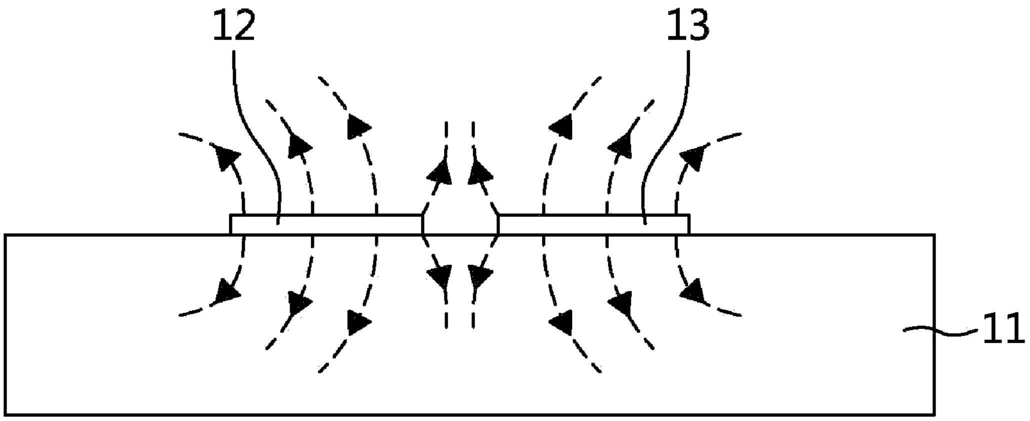
Figure 8:
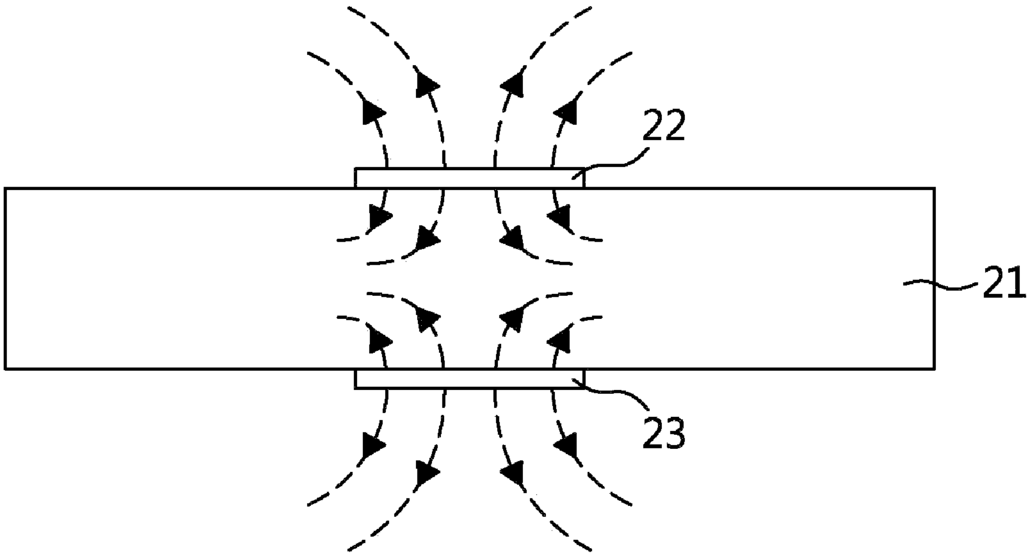

(a) of FIG. 7 illustrates a diagram of an electric field distribution of a differential signal in the CPS line, and (b) of FIG. 7 illustrates a diagram of the electric field distribution of a differential signal in the PSL line. (a) of FIG. 8 illustrates a diagram of an electric field distribution of a common-mode signal in the CPS line, and (b) of FIG. 8 illustrates a diagram of the electric field distribution of a common-mode signal in the PSL line.

Referring to (a) of FIG. 7, electric field lines heading from the second signal line 13 to the first signal line 12 are primarily formed. In other words, there is a condition in which the electric field is mainly concentrated between the second signal line 13 and the first signal line 12. Referring to (b) of FIG. 7, electric field lines heading from the second signal line 23 to the first signal line 22 are primarily formed. On the contrary, referring to (a) and (b) of FIG. 8, there are only electric field lines that exit from the first signal lines 12 and 22, and the second signal lines 13 and 23, without field-terminating lines.

In the case of the balanced line, a common-mode signal should be suppressed at any degree due to structural characteristics, and there is strong electromagnetic coupling between two signal lines to recover a phase of a distorted signal.

The present invention proposes a method for placing structures that may suppress or reject the common-mode signal while minimizing the influence of the differential signal on the balanced line, are capable of transmitting the digital signal at an ultra-high speed, and autonomously recover the distorted phase on the balanced line.

Figure 9:
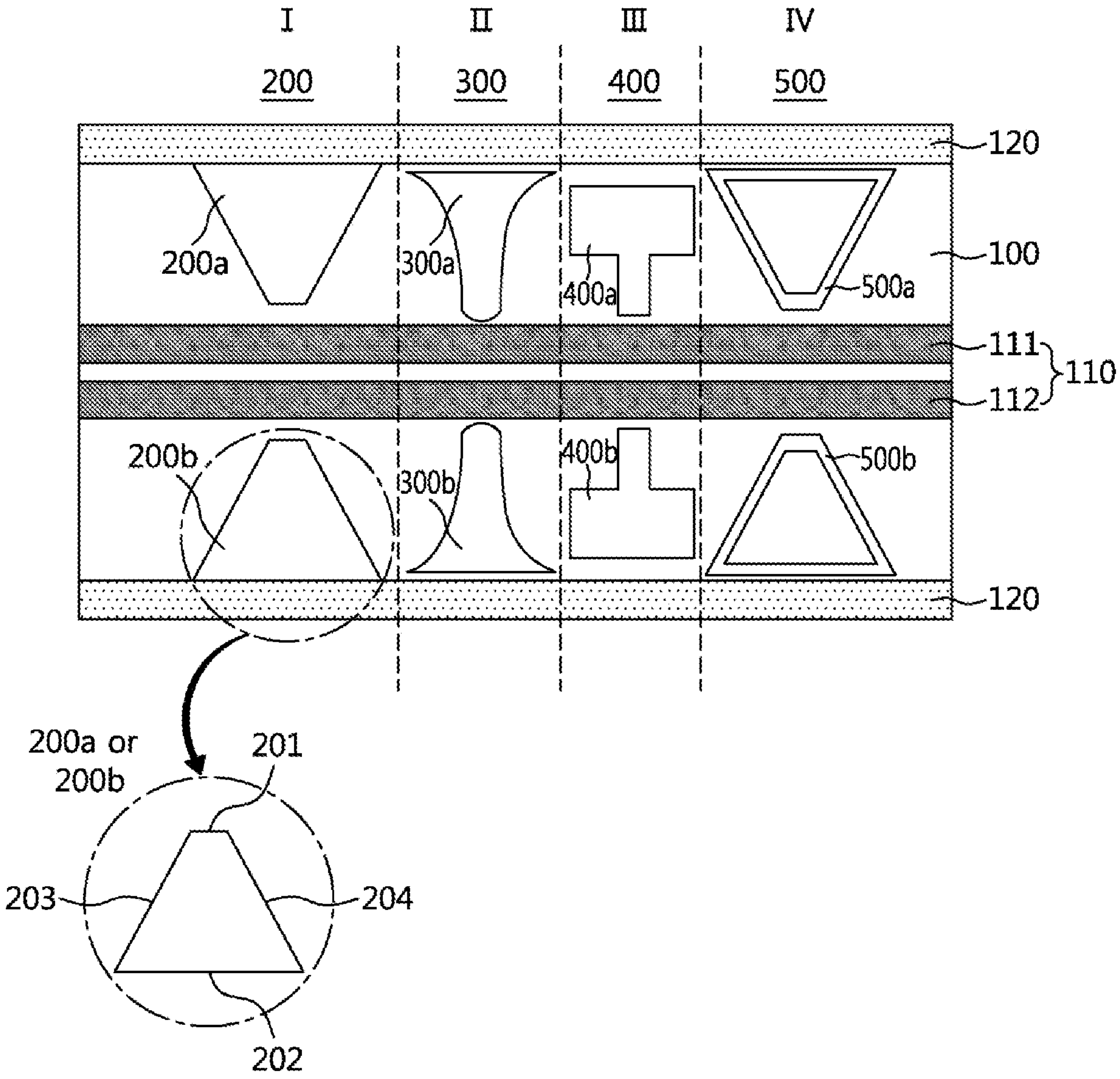
FIG. 9 illustrates a diagram showing an example of unit structures forming ultra-high speed digital signal integrity improving structures according to an example of the present invention.

FIG. 9 is a diagram illustrating an example of unit structures forming ultra-high speed digital signal integrity improving structures according to an example of the present invention. As mentioned before, the structure of the present invention provides the feature of being capable of suppressing the progress of the common-mode signal component while minimizing the influence on the differential signal component in a digital signal and, at the same time, autonomously recovering the distorted phase.

Referring to FIG. 9, the structures of the present invention are formed as a conductor on an upper surface or a lower surface of the dielectric substrate and placed to face each other around a first signal line 111 and a second signal line 112, which compose a balanced line 110 formed at the center of a substrate 100.

In FIG. 9, different-shaped structures 200, 300, 400, and 500 are exemplified and illustrated in regions I to IV along a longitudinal direction of the balanced line 110, and respective structures 200, 300, 400, and 500 include first unit structures 200*a*, 300*a*, 400*a*, and 500*a* and second unit structures 200*b*, 300*b*, 400*b*, and 500*b*, which are placed to face each other with the balanced line 110 in the center. In respect to the first unit structures 200*a*, 300*a*, 400*a*, and 500*a* and the second unit structures 200*b*, 300*b*, 400*b*, and 500*b* exemplified to face each other along with the balanced line 110 in the center, unit structures of the same shape or different shapes may be placed as a pair.

Respective unit structures, exemplified as the first to fourth structures 200, 300, 400, and 500, may be variously formed but may be designed according to the following rules. Since the same rules can be applied to all structures, the first structure 200 is described as an example.

Referring to any one exemplified unit structure 200*a* or 200*b* of the first structure 200, the unit structure 200*a* or 200*b* may be formed to include a first side (upper side) 201 close to the balanced line 110 and having a linear or curve shape, a second side (lower side) 202 facing the first side 201, and left and right sides 203 and 204 connecting the first side 201 and the second side 202. The first side 201 may be formed to have a smaller width than or the same width as that of the second side 202. Further, there may be a structure in which the left and right sides 203 and 204 have a linear or non-linear slope, and the width is continuously changed or discontinuously changed from the first side 201 to the second side 202. A continuous shape may be a linear or curve shape, and a discontinuous shape may be a step shape.

Meanwhile, as in FIG. 9, any one structure 500 may be a shape in which a portion of an internal conductor is removed.

The unit structure manufactured according to such a design rule may be arranged on the balanced line according to the following rule.

As illustrated in FIG. 9, the first unit structures 200*a*, 300*a*, 400*a*, and 500*a* and the second unit structures 200*b*, 300*b*, 400*b*, and 500*b* of the structures 200, 300, 400, and 500 are positioned to face each other around the balanced line 110, respectively. In FIG. 9, with respect to the placement direction of the unit structure, a first side may be positioned on a lateral surface of the balanced line 110, and the first side may be positioned on the same plane or on an upper or lower end in which the balanced line 110 is formed in the substrate. In this case, the first side is not connected to a first side of a facing unit structure but placed spaced apart by a predetermined gap distance from the first side of the facing unit structure. In addition, the second side may be connected to a ground 120 or placed spaced apart by a predetermined gap distance from the ground 120. In FIG. 9, a type connected to the ground is the first structure 200, and a type spaced apart by the predetermined gap distance from the ground may be the second to fourth structures 300, 400, and 500.

One or multiple unit structures continuously placed in the longitudinal direction of the balanced line 110 may be placed periodically or aperiodically, and different-shaped structures may be placed jointly, and the structures may be placed to overlap with each other. For example, in FIG. 9, only the first structure 200 may be continuously arranged, the first structure 200 and the second structure 300 are repeatedly arranged, or the first structure 200, the second structure 300, and the third structure 400 may be arranged in order.

Figure 10:
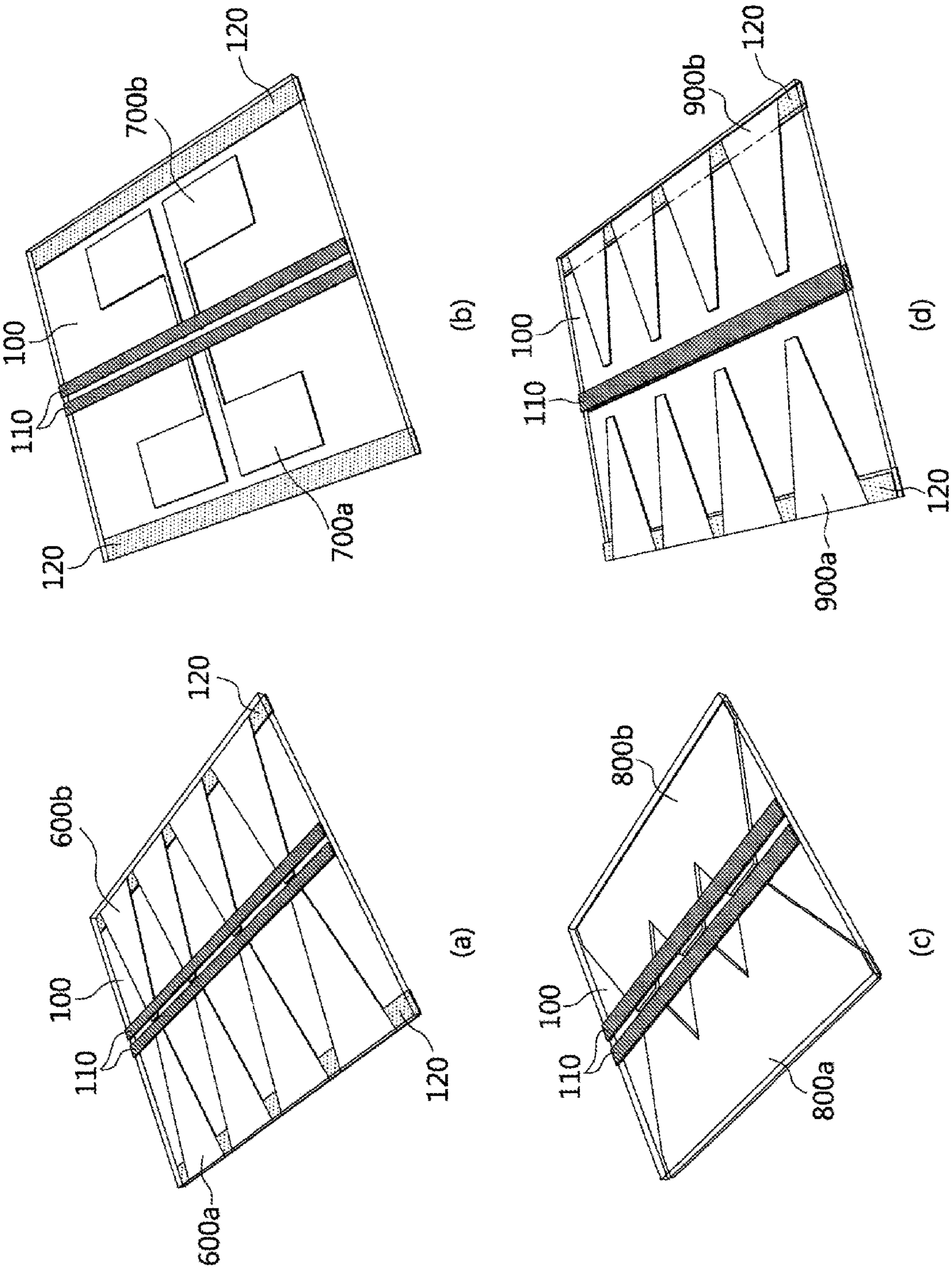
FIG. 10 illustrates diagrams showing an example in which the structures of the present invention, which have various shapes, are arranged on the substrate.

Various examples in which the structures of the present invention are arranged around the balanced line 110 may be seen in FIG. 10. FIG. 10 illustrates diagrams showing examples in which the structures of the present invention, which have various shapes, are arranged on the corresponding substrates.

Referring to (a) of FIG. 10, structures 600*a* and 600*b* having the same shape are arranged to be symmetric to each other around the balanced line 110 at the center of the substrate 100. First sides of the structures 600*a* and 600*b* facing each other are spaced apart from each other by a predetermined gap distance while being positioned at the lower end of the balanced line 110, and second sides are connected to the ground 120.

Structures 700*a* and 700*b* of (b) of FIG. 10 have an approximately flag shape. Referring to (b) of FIG. 10, the first structure 700*a* and the second structure 700*b* are symmetric to each other and are arranged to be symmetric to each other in the longitudinal direction of the balanced line 110.

Structures 800*a* and 800*b* of (c) of FIG. 10 are examples in which respective unit structures having a trapezoidal shape are positioned with predetermined regions to overlap in the longitudinal direction of the balanced line 110 and formed as one structure.

(d) of FIG. 10 illustrates an example in which the structures of the present invention are arranged in the PSL line. In (d) of FIG. 10, one structure 900*a* is positioned at the upper end of the substrate 100, and the other structure 900*b* is positioned at the lower end of the substrate 100 around the balanced line 110, which are symmetric to each other. In addition, first sides of the structures 900*a* and 900*b* are spaced apart from each other, and second sides are connected to the ground 120.

In the above description, the examples in which the structures are arranged on the substrate only with the balanced line according to the predetermined rule are described.

However, the present invention may also be applied to a line with both the differential line and the balanced line, so the present invention will be continuously described with reference to FIG. 11.

Figure 11:
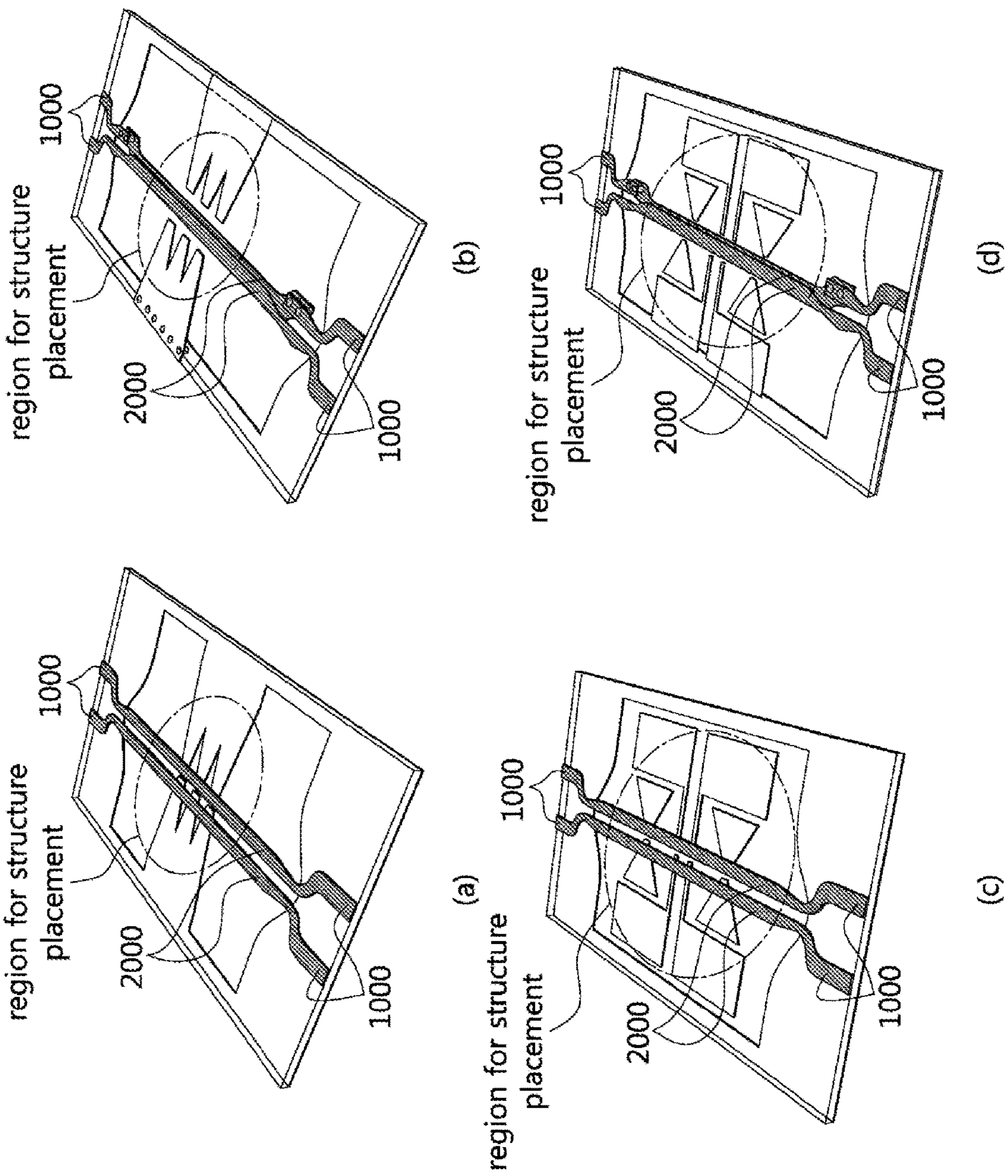
FIG. 11 illustrates a diagram showing a state in which the structures of the present invention are combined by an ultra-wideband transition structure between the differential line and the balanced line.

FIG. 11 is a diagram illustrating a state in which the structures of the present invention are combined by an ultra-wideband transition structure between the differential line and the balanced line. Here, the transition structure is disclosed in Application No. 10-2021-0138269 (Transition structures for ultra-high speed digital signal transmission and digital transmission lines thereof) filed on Oct. 18, 2021 by the present applicant. The transition structure connects the balanced line to the differential line to transmit the digital signal at ultra-high speed, and the balanced line combined with the transition structure has a frequency band of up to dozens of GHz or more, primarily propagates the differential signal, and enables common-mode signal or electromagnetic interference (EMI) suppression, autonomous phase recovery, etc. Further, the balanced line may adopt various line impedances according to the situation of the circuit.

Therefore, the balance line combined with an ultra-wideband transition structure for ultra-high speed digital signal transmission provides characteristics of common-mode signal rejection and phase recovery in an ultra-wideband, and a common-mode signal rejection performance may be approximately 5 to 10 dB in an operating frequency band of up to dozens of GHz or more. In other words, there is an advantage in that the structures of the present invention are additionally placed around the balanced line, including the transition structure, to significantly enhance the common-mode signal rejection performance in an ultra-wideband frequency band.

Referring to (a) to (d) of FIG. 11, in a structure in which a differential line 1000 and a balanced line 2000 are connected, the structures of the present invention are placed around the balanced line 2000. In respect to the structures of (a) of FIG. 11, mountain-shaped structures are placed to face each other, and first sides are spaced apart from each other while being positioned at the lower end of the balanced line. In respect of the structures of (b) of FIG. 11, in transition structures connecting a differential line and a second-type balanced line (PSL), the mountain-shaped structures are placed to face each other around the balanced line 2000, and first sides are spaced apart from the balanced line. (c) and (d) of FIG. 11 show shapes in which two or more unit structures having different shapes are placed to be symmetric to each other around a vertical direction of the balanced line 2000, and furthermore, are also placed symmetrically to each other in a longitudinal direction of the balanced line 2000.

As such, in a structure in which the differential line and the balanced line of the circuit board are connected with optimal performance, the structures of the present invention may be applied around the balanced line, and accordingly, common-mode signals may be significantly rejected, thereby improving the quality of the digital signal.

Figure 12:
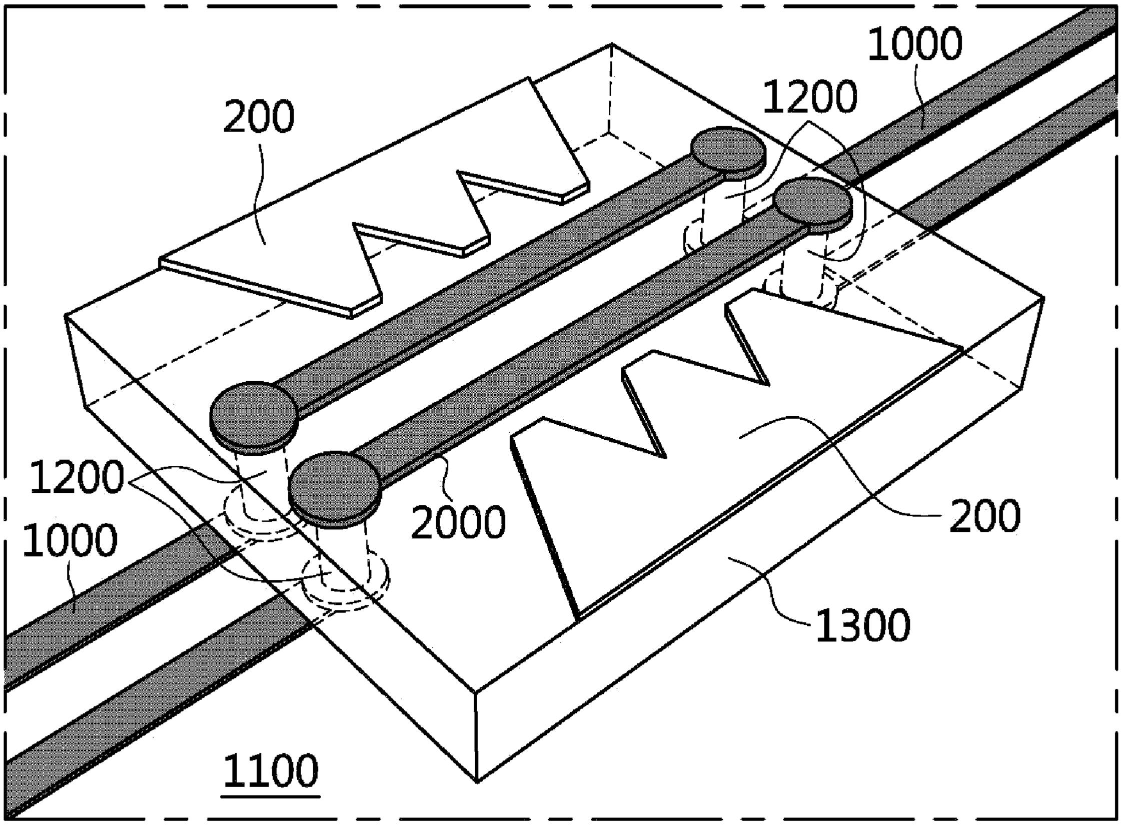
FIG. 12 illustrates a diagram showing a surface-mounted digital signal integrity improving structure, including the structures of the present invention.

FIG. 12 is a diagram illustrating a surface-mounted digital signal integrity improving structure, including the structures of the present invention. A transmission line structure of FIG. 12 enables the surface-mounted digital signal integrity improving structure to be applied to the existing general digital circuit boards.

Referring to this, the surface-mounted digital signal integrity improving structure includes a first substrate 1100 with a differential line 1000 and a second substrate 1300 connected through a via 1200. In the second substrate 1300, a structure of the via 1200 is used, so the balanced line 2000 connected to the differential line 1000 of the digital signal circuit board is formed, and structures 200 of the present invention are placed to face each other around the balanced line 2000.

That is, in the second substrate 1300, the balanced line 2000 and the structure 200 are jointly configured in a module form, which is possible to be compatible with a general digital transmission line.

The structure applied to the second substrate 1300 may adopt all structures having various shapes described above in addition to the structure illustrated in FIG. 12, and further may also be implemented in a multi-layered substrate.

Continuously, performance evaluation for the structure of the present invention is described.

In the performance evaluation, a common-mode signal suppression performance and a phase recovery performance are evaluated through a 3D EM simulation with respect to a case of the structures of the present invention combined by the transition structure for the ultra-high speed digital signal transmission filed by the present applicant. Furthermore, the structures of the present invention are implemented using the corresponding substrate and measured by a commercial 4-port network analyzer to confirm a similar performance to the simulation.

Figure 13:
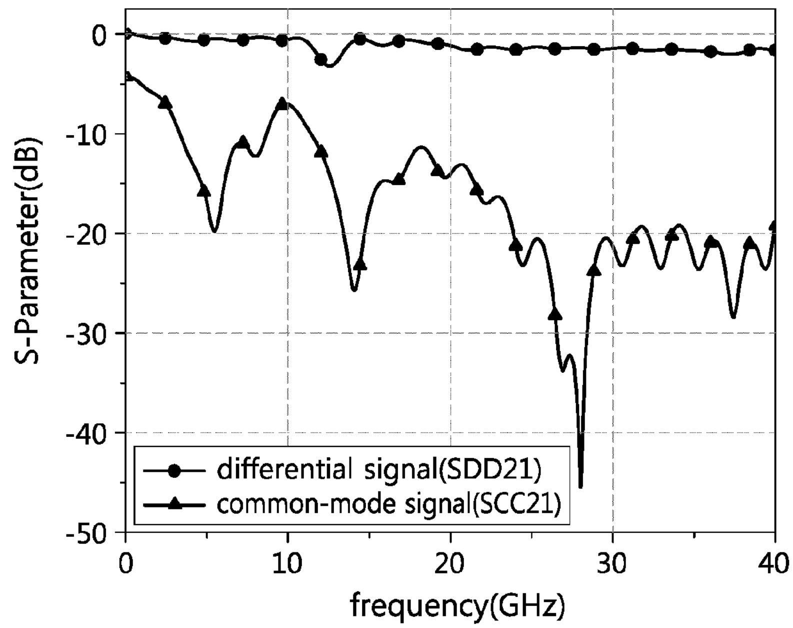
FIG. 13 illustrates a graph showing an EM simulation result in a case of applying the structures of the present invention to a Rogers 4003 8-mil substrate.
Figure 13:
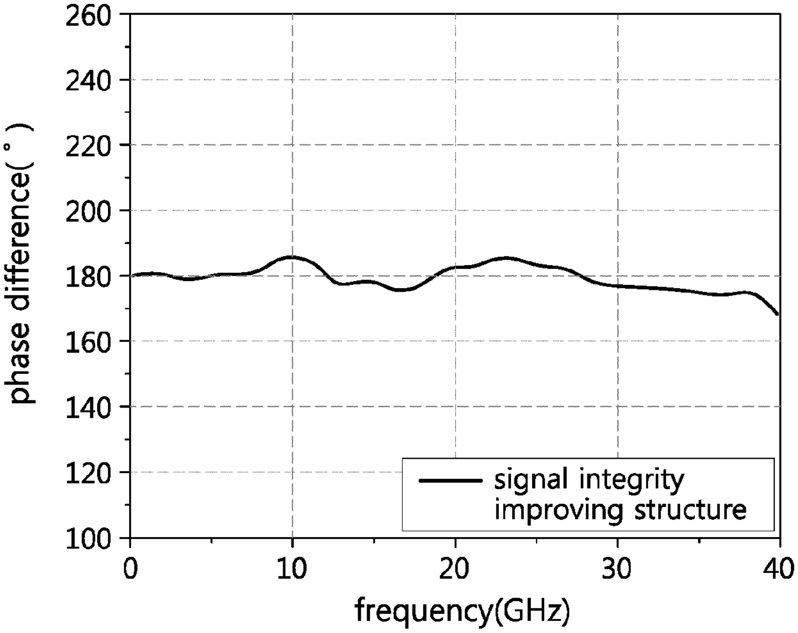

FIG. 13 is a graph showing an EM simulation result in a case of applying the structures of the present invention to a Rogers 4003 8-mil substrate. (a) of FIG. 13 is a graph showing a common-mode signal suppression level, and (b) of FIG. 13 is a graph showing a phase recovery level.

Referring to (a) of FIG. 13, it can be seen that a common-mode signal of 7 dB or more may be blocked in a frequency band of 2.4 GHz to 40 GHz or more, and it is characterized in that a common-mode signal of 10 dB or more is blocked in a frequency band of 11.4 GHz to 40 GHz or more. In this case, attenuation for the differential signal is up to 3.1 dB and an average of 1.1 dB at up to 40 GHz, so it is confirmed that the transmission characteristics of the differential signal are excellent.

In respect to the phase recovery level of (b) of FIG. 13, there is a length difference of 30 mil between signal lines of a differential line, and it can be seen that the phase is recovered within 20 degrees in a frequency band of 40 GHz or more.

Figure 14:
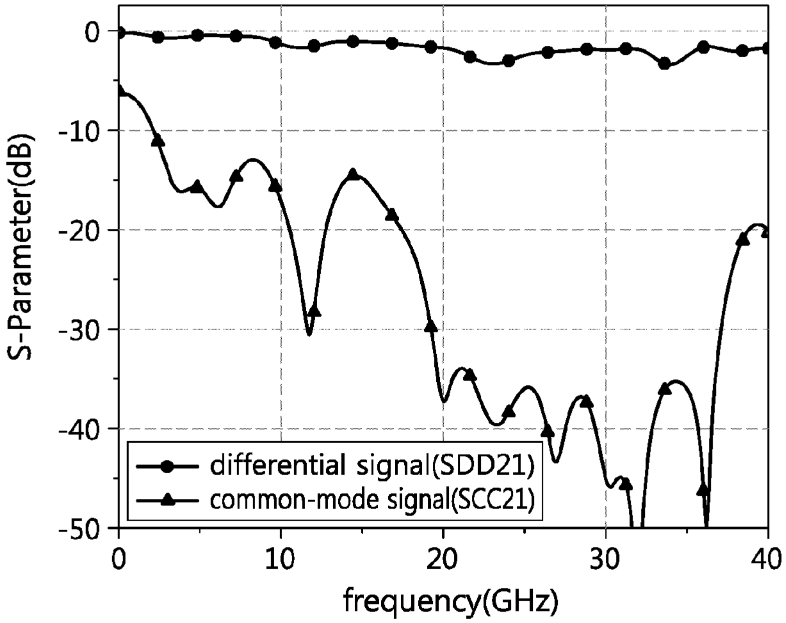
FIG. 14 illustrates a graph showing an EM simulation result in a case of applying the structures of the present invention to a Duroid 5880 10 mil substrate.
Figure 14:
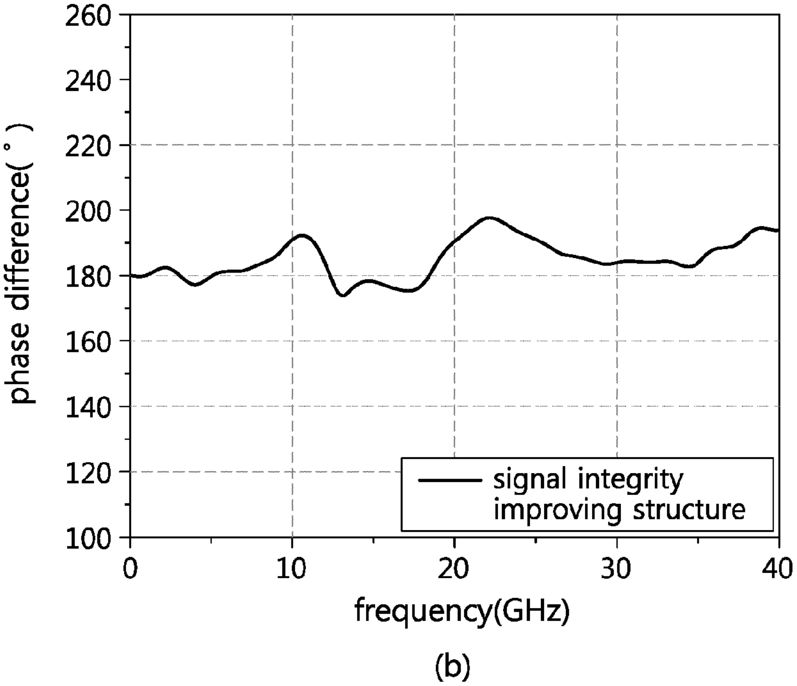

FIG. 14 is a graph showing an EM simulation result in a case of applying the structures of the present invention to a Duroid 5880 10 mil substrate.

Referring to (a) of FIG. 14, it can be seen that a common-mode signal of 10 dB or more may be blocked in a frequency band of 2.1 GHz to 40 GHz or more, and it is characterized in that a common-mode signal of 15 dB or more is blocked in a frequency band of 9.3 GHz to 40 GHz or more. In this case, the attenuation for the differential signal is up to 3.2 dB and an average of 1.6 dB at up to 40 GHz, so it is confirmed that the transmission characteristics of the differential signal are excellent.

In respect to the phase recovery level of (b) of FIG. 14, there is a length difference of 60 mil between signal lines of a differential line, and it can be seen that the phase is recovered within 20 degrees in a frequency band of 40 GHz or more.

As described above, it can be seen that when the structures of the present invention are applied around the balanced line, common-mode signal rejection and autonomous phase recovery are possible in the ultra-wideband, and accordingly, the integrity of the digital signal can be improved, and next-generation ultra-high speed digital signal transmission becomes possible.

In addition, when the structures of the present invention are also applied to the general FR4 substrate, the phase difference generated by the length difference between two signal lines of a differential line can be recovered without the influence of the configured fiber weave structure of the substrate, so ultra-high speed digital signal transmission, which is significantly improved compared to the related art, can be made even by using an inexpensive PCB process.

Further, when the structures of the present invention are applied to the differential line-based digital circuit board, the integrity of the digital signal can be improved.

Further, when the structures of the present invention are combined by the ultra-wideband transition structure connecting the balanced line to the differential line, high-integrity ultra-high speed digital signal transmission is possible in the frequency band of 40 GHz or more.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. Ultra-high speed digital signal integrity improving structures, the structures arranged to face each other on left and right sides along a longitudinal direction of a balanced line, centered around a first-type balanced line or a second-type balanced line formed on a substrate, to remove a common-mode signal and recover a distorted phase while minimally affecting a differential signal, comprising:

a first unit structure and a second unit structure, which may be identical or different in shape, wherein at least one of the first unit structure and the second unit structure comprises:

a first side close to the balanced line and having a linear or curve shape;

a second side facing the first side; and left and right sides connecting the first side and the second side, wherein a width of the first side is less than or equal to a width of the second side, wherein the left and right sides have a linear or non-linear slope, and a width from the first side to the second side is configured to change continuously or discontinuously, and wherein the first-type balanced line is a coplanar stripline (CPS), and the second-type balanced line is a parallel stripline (PSL), wherein the structures are arranged along the longitudinal direction of the balanced line, with at least one or more structures, wherein the arranged structures have either identical or different shapes, and wherein the balanced line is not a coplanar waveguide and does not include ground plane conductors disposed adjacent to two signal lines of the balanced line, such that two signal lines of the balanced line serve as mutual ground conductors to each other.

2. The structures of claim 1, wherein the structures are formed entirely from a conductor.

3. The structures of claim 1, wherein the structures are configured in a state in which a portion of an internal conductor is removed.

4. The structures of claim 1, wherein a first side of the first unit structure and a first side of the second unit structure are spaced apart at a predetermined gap distance.

5. The structures of claim 1, wherein a second side of the first unit structure and a second side of the second unit structure are connected to or spaced apart from a ground formed on the substrate.

6. The structures of claim 1, wherein the structures are arranged along the longitudinal direction of the balanced line periodically or aperiodically.

7. Ultra-high speed digital signal integrity improving structures, the structures combined by an ultra-wideband transition structure connecting a balanced line to a differential line, arranged to face each other on left and right sides along a longitudinal direction of the balanced line to remove a common-mode signal and recover a distorted phase while minimally affecting a differential signal, comprising a first unit structure and a second unit structure, which may be identical or different in shape, wherein at least one of the first unit structure and the second unit structure comprises:

a first side close to the balanced line and having a linear or curve shape;

a second side facing the first side; and left and right sides connecting the first side and the second side, wherein a width of the first side is less than or equal to a width of the second side, and wherein the left and right sides have a linear or non-linear slope, and a width from the first side to the second side is configured to change continuously or discontinuously.

8. The structures of claim 7, wherein the structures are formed either entirely from a conductor or with a portion of an internal conductor removed.

9. The structures of claim 7, wherein a first side of the first unit structure and a first side of the second unit structure are spaced apart at a predetermined gap distance.

10. The structures of claim 7, wherein a second side of the first unit structure and a second side of the second unit structure are connected to or spaced apart from a ground formed on a substrate.

11. The structures of claim 7, wherein the structures are arranged along the longitudinal direction of the balanced line, with at least one or more structures, wherein the arranged structures have either identical or different shapes, and wherein the structures are arranged along the longitudinal direction of the balanced line periodically or aperiodically.

12. Surface-mounted digital signal integrity improving structures, comprising:

a first substrate with a differential line;

a second substrate with a balanced line, wherein, on the second substrate, the structures are arranged to face each other on the left and right sides along a longitudinal direction of the balanced line, centered around the balanced line, wherein the structures comprise a first unit structure and a second unit structure, which may be identical or different in shape, wherein at least one of the first unit structure and the second unit structure comprises:

a first side close to the balanced line and having a linear or curve shape;

a second side facing the first side; and left and right sides connecting the first side and the second side, wherein a width of the first side is less than or equal to a width of the second side, and wherein the left and right sides have a linear or non-linear slope, and a width from the first side to the second side is configured to change continuously or discontinuously.

13. The structures of claim 12, wherein the structures are formed either entirely from a conductor or with a portion of an internal conductor removed.

14. The structures of claim 12, wherein a first side of the first unit structure and a first side of the second unit structure are spaced apart at a predetermined gap distance.

15. The structures of claim 12, wherein a second side of the first unit structure and a second side of the second unit structure are connected to or spaced apart from a ground formed on the second substrate.

16. The structures of claim 12, wherein the structures are arranged along the longitudinal direction of the balanced line, with at least one or more structures, wherein the arranged structures have either identical or different shapes, and wherein the structures are arranged along the longitudinal direction of the balanced line periodically or aperiodically.

* * * * *